United States Patent [19]
Loix et al.

[11] Patent Number: 5,608,228
[45] Date of Patent: Mar. 4, 1997

[54] RUBBER CHEMICAL PREPARATION

[75] Inventors: René Loix, Leimen; Hans-Joachim Graf, Mannheim; Harald Kleinknecht, Alzey, all of Germany

[73] Assignee: Rhein Chemie Rheinau GmbH, Mannheim, Germany

[21] Appl. No.: 339,588

[22] Filed: Nov. 14, 1994

[30] Foreign Application Priority Data

Nov. 24, 1993 [DE] Germany .......................... 43 39 984.3

[51] Int. Cl.$^6$ ....................................... C09K 3/00
[52] U.S. Cl. .................. 252/182.13; 252/186.25
[58] Field of Search .................. 252/182.11–182.17, 252/182.28, 182.33, 189, 188.31, 186.25; 264/297.5; 528/389

[56] References Cited

U.S. PATENT DOCUMENTS

| | | | |
|---|---|---|---|
| 3,850,845 | 11/1974 | Vickery | 252/430 |
| 3,923,680 | 12/1975 | Roeder et al. | 252/182 |
| 3,923,712 | 12/1975 | Vickery . | |
| 3,979,316 | 9/1976 | Bartzsch | 252/189 |
| 4,032,469 | 6/1977 | Bartzsch | 252/182 |
| 4,670,181 | 6/1987 | Mollinger et al. | 252/186.25 |

FOREIGN PATENT DOCUMENTS 0563906 10/1993 European Pat. Off. .

OTHER PUBLICATIONS

Lexikon der Kautschuk Technik, p. 356 (1991).

*Primary Examiner*—Charles T. Jordan
*Assistant Examiner*—John R. Hardee
*Attorney, Agent, or Firm*—Connolly and Hutz

[57] ABSTRACT

Rubber chemical preparation consisting of or comprising rubber chemicals in finely divided form and a carrier liquid, in which the rubber chemical particles have a mean diameter (weight average $d_{50}$) from 2 μm to 20 μm, preferably <10 μm, and exhibit a very narrow diameter distribution corresponding to $\delta d_{10}-d_{90} \leq 20$ μm, preferably <10 μm.

12 Claims, No Drawings

RUBBER CHEMICAL PREPARATION

Rubber chemicals are mostly solids, which are added to rubber mixtures to modify their properties and to cause their cross-linking (vulcanisation). This refers, for example, to vulcanising agents, vulcanisation accelerators, fillers, carbon blacks, antioxidants, plasticisers, rubber extension oils, and similar additives. Rubber chemicals are mostly incorporated in the rubber mixture on rubber rolls or in internal kneaders, with as far as possible homogeneous distribution being necessary. Solids must thus be present in as fine a distribution as possible, i.e. as powders, so that a major dust nuisance occurs during incorporation.

Many methods have been developed to be able to handle rubber chemicals better. Pulverulent additives have thus been briquetted or bound with oil or also with polymers. Thermoplastics have been used as polymers, as well as products such as faktis, which are themselves rubber additives. All these preparations are not yet fully satisfactory, although they represent major progress in relation to the incorporation of rubber additive powders. A reason for this is the excessively large bandwidth of the diameters of the rubber chemical particles and the agglomeration of particles. These diameters range from around 1 mm down to dust fractions with diameters under 2 μm.

The present invention provides rubber chemical preparations, e.g. pastes of rubber chemicals finely grinded in a liquid, in which the rubber chemical particles have a mean diameter (weight average $d_{50}$) from 5 μm to 30 μm and exhibit a very narrow diameter distribution corresponding to $\Delta d_{10}-d_{90} \leq 20$ μm and no particle >50 μm, preferably no particle >30 μm.

By $d_{50}$ is meant the particle diameter above which and below which the diameters of respectively 50 wt % of the particles lie; $d_{10}$ is the diameter above which 10 wt % and below which 90 wt % of the particles lie; and $d_{90}$ is the diameter above which 90 wt % and below which 10 wt % of the particles lie. $\Delta d_{10}-d_{90}$ is the difference between both these values, being a measure of the distribution width. The smaller this difference, the narrower is the particle diameter distribution.

The rubber chemical preparations according to the invention generally contain 10 to 80 wt %, preferably 40 to 60 wt % rubber chemicals, and 90 to 20 wt % carrier liquid. They are generally pasty, but may be solid or liquid depending on the amount of incorporated rubber chemicals.

Rubber chemicals according to this invention are especially accelerators, cross-linking agents, ASM, activators, and stabilisers.

As carrier liquids, consideration is primarily given to synthetic plasticisers, e.g. esters, alcohols, epoxidated oils, mineral oils, liquid powders, liquid ASM, and mixtures thereof.

To manufacture the rubber chemical preparations according to the invention, the rubber chemicals can initially be precomminuted and then mixed with the carrier liquid. The mixture is then ground, e.g. in a bead mill.

PRINCIPLE OF BEAD MILL

The mill consists of a grinding container filled with a large number of small beads.

The bead size and material type may vary depending on the grinding requirements, e.g. 0.3–10 mm dia. The material may be e.g. glass, ceramic, metal. The grinding container may additionally contain a stirrer.

The unit can generally be cooled. The separately prepared mixture of rubber chemical(s) is supplied to the grinding container e.g. via a pump or screw.

The beads set in motion by the product flow and stirrer preferentially wear down coarser primary particles and agglomerates and homogenise the mixture.

Previous practice has been first to grind the (solid) rubber chemicals and then to treat further the contained powder. In this invention, the foregoing procedure is adopted, so that the solids are ground in the presence of the carrier substance. This gives rise to rubber chemical particles of the desired size that are directly dispersed in the carrier liquid. The carrier liquid also achieves especially good wetting of the surface of these particles, so that a reagglomeration of the particles is prevented.

EXAMPLES

Example 1

| | |
|---|---|
| Mesamoll plasticiser | 50 parts |
| (alkyl sulphonic acid ester of phenol) | |
| Benzothiazyl-cyclohexylsulphenamide (CBS) | 50 parts |
| The CBS powder is mixed in the Mesamoll with a dissolver. | |
| The paste obtained is ground in a bead mill. | |

| Dissolver parameters: | |
|---|---|
| Rev. min$^{-1}$ | 3265 |
| Final temperature (°C.) | 28 |
| Mixing time (min) | 5 |

| Bead mill parameters: | |
|---|---|
| Rev. min$^{-1}$ | 1000 |
| Grinding bead dia. (mm) | 1.2 |
| Bead fill fraction (%) | 80 |
| Cooling | ON |
| Ground substance temperature (°C.) | 54 |

| | Particle size determination: percentage distribution of particles | | | | | | | | | | | | |
|---|---|---|---|---|---|---|---|---|---|---|---|---|---|
| | Optical evaluation by microscope | | | | | | | | | | | | |
| | −2 | −5 | −10 | −20 | −30 | −40 | −50 | −80 | −100 | −200 | −500 | −1000 | −2000 μm |
| CBS powder/ stirred up in plasticizer | 10 | 40 | 20 | 10 | 8 | 8 | 3 | 0.2 | 0.2 | — | — | 0.1 | — |
| Mixture after dissolver | 10 | 40 | 20 | 10 | 8 | 7 | 4 | 0.2 | 0.2 | — | — | — | — |

-continued

| | Particle size determination: percentage distribution of particles | | | | | | | | | | | | |
|---|---|---|---|---|---|---|---|---|---|---|---|---|---|
| | Optical evaluation by microscope | | | | | | | | | | | | |
| | −2 | −5 | −10 | −20 | −30 | −40 | −50 | −80 | −100 | −200 | −500 | −1000 | −2000 μm |
| Mixture after grinding | 20 | 40 | 30 | 5 | 5 | — | — | — | — | — | — | — | — |

Example 2

| | |
|---|---|
| Zinc dibenzyldithiocarbamate powder (ZBEC) | 50 parts |
| Mesamoll | 50 parts |
| (alkyl sulphonic acid ester of phenol) | |

The ZBEC powder is mixed in the Mesamoll with a dissolver.
The paste obtained is ground in a bead mill.

| Dissolver parameters: | |
|---|---|
| Rev. min⁻¹ | 3265 |
| Final temperature (°C.) | 29 |
| Mixing time (min) | 5 |

| Bead mill parameters: | |
|---|---|
| Rev. min⁻¹ | 1000 |
| Grinding bead dia. (mm) | 1.2–1.4 |
| Bead fill fraction (%) | 80 |
| Cooling | ON |
| Ground substance temperature (°C.) | 58 |

| Characteristics of ZBEC powder: | |
|---|---|
| Total sulphur (%) | 21.6 |
| Ash (%) | 14.0 |
| Wet screen residue (%) 63 μm | 17.7 |

| Example of mixing tests: | | |
|---|---|---|
| Red test batch formulation: | NR SMR 5CV50 | 30 parts |
| | SBR 1712 | 70 parts |
| | Bayferrox 720 N | 0.9 part |
| Red test batch: | I | II |
| ZBEC powder | 275 g | 275 g |
| ZBEC/plasticiser 50/50 | 75 g | — |
| (50/50 ground) | - g | 75 g |

Mixing time: 7 min on laboratory rolling mill.
Spot evaluation: premixing I and II.
Sectional area: 40 cm² with microscope at
× 40 magnification.

| | Number/40 cm² | |
|---|---|---|
| Particle size | I | II |
| >75–100 μm | inn. | 0 |
| >100–150 μm | inn. | 0 |
| >100–250 μm | inn. | 0 |
| >250 μm | 19 | 0 |
| | (up to 525 μm) | | inn. = innumerable particles

| | Particle size determination: percentage distribution of particles | | | | | | | | | | | | | |
|---|---|---|---|---|---|---|---|---|---|---|---|---|---|---|
| | Optical evaluation by microscope | | | | | | | | | | | | | |
| | −2 | −5 | −10 | −20 | −30 | −40 | −50 | −60 | −80 | −100 | −200 | −500 | −1000 | −2000 μm |
| ZBEC powder/ stirred up in plasticizer | 10 | 10 | 20 | 25 | 8 | 6 | 3 | 3 | 3 | 4 | 3 | 3 | 2 | 1 |
| Mixture after dissolver | 10 | 10 | 20 | 25 | 8 | 6 | 2 | 2 | 4 | 4 | 4 | 2 | 2 | 1 |
| Mixture after grinding | 50 | 23 | 25 | 1 | 1 | — | — | — | — | — | — | — | — | — |

Example 3

| | |
|---|---|
| Castor oil | 15 parts |
| Dioctyl adipate (DOA) | 30 parts |
| Grinding sulphur | 50 parts |

The grinding sulphur powder is mixed in the castor oil/DOA plasticiser mixture with a dissolver. The paste obtained is ground in a bead mill.

| Dissolver parameters: | |
|---|---|
| Rev. min$^{-1}$ | 3265 |
| Final temperature (°C.) | 28 |
| Mixing time (min) | 5 |

| Bead mill parameters: | |
|---|---|
| Rev. min$^{-1}$ | 1000 |
| Grinding bead dia. (mm) | 1.2–1.4 |
| Bead fill fraction (%) | 80 |
| Cooling | ON |
| Ground substance temperature (°C.) | 58 |

| Characteristics of grinding sulphur: | |
|---|---|
| Total sulphur (%) | 99.80 |
| Ash (%) | 0.00 |
| Wet screen residue (%) 63 μm | 9 |

Example 4

| | |
|---|---|
| Dibenzothiazyl disulphide powder (MBTS) | 50 parts |
| Mesamoll plasticiser | 50 parts |
| (alkyl sulphonic acid ester of phenol) | |

The MBTS powder is mixed in the Mesamoll with a dissolver. The paste obtained is ground in a bead mill.

| Dissolver parameters: | |
|---|---|
| Rev. min$^{-1}$ | 3265 |
| Final temperature (°C.) | 23 |
| Mixing time (min) | 5 |

| Bead mill parameters: | |
|---|---|
| Rev. min$^{-1}$ | 1000 |
| Grinding bead dia. (mm) | 1.2–1.4 |
| Bead fill fraction (%) | 80 |
| Cooling | ON |
| Ground substance temperature (°C.) | 65 |

Particle size determination: percentage distribution of particles

Optical evaluation by microscope

| | −2 | −5 | −10 | −20 | −30 | −40 | −50 | −60 | −70 | −80 | −90 | −100 | −200 | −500 | −1000 | −2000 μm |
|---|---|---|---|---|---|---|---|---|---|---|---|---|---|---|---|---|
| sulphur powder/ stirred up in plasticizer | 2 | 5 | 10 | 10 | 10 | 10 | 10 | 8 | 6 | 5 | 4 | 3 | 2 | 1 | 1 | 1 |
| Mixture after dissolver | 2 | 5 | 10 | 20 | 10 | 10 | 10 | 8 | 6 | 5 | 5 | 3 | 2 | 2 | 2 | — |
| Mixture after grinding | 10 | 25 | 20 | 13 | 12 | 9 | 1 | — | — | — | — | — | — | — | — | — |

Example of mixing tests:

| Red test batch formulation: | NR SMR 5 CV 50 | 30 parts | |
|---|---|---|---|
| | SBR 1712 | 70 parts | |
| | Ferric oxide $Fe_2O_3$ (Bayferrox 720 N) | 0.9 part | |
| | I | II | III |
| Red test batch | 275 g | 275 g | 275 g |
| MBTS powder | 75 g | — | — |
| MBTS/plasticiser mixing ratio 1:1 | — | 75 g | — |
| MBTS batch, 80% in elastomer | — | — | 75 g |

Spot evaluation: test batches I, II, and III.
Sectional area: 40 cm² with microscope at × 40 magnification.

| | Number of particles/40 cm² | | |
|---|---|---|---|
| Particle size | I | II | III |
| >40–75 μm | inn. | 0 | 42 |
| >75–100 μm | 12 | 0 | 22 |
| >100–250 μm | 2 | 0 | 18 |
| >250 μm | 0 | 0 | 1 (475 μm) | inn. = innumerable particles

Particle size determination: percentage distribution of particles

| | Optical evaluation by microscope | | | | | | | | | | | |
|---|---|---|---|---|---|---|---|---|---|---|---|---|
| | –2 | –5 | –10 | –20 | –30 | –40 | –50 | –60 | –70 | –80 | –100 | >100 μm |
| MBTS powder/ stirred up in plasticizer | 78 | 14 | 4 | 3 | 1 | 1 | — | — | — | — | — | — |
| Mixture after dissolver | 82 | 10 | 5 | 2 | 1 | — | — | — | — | — | — | — |
| Mixture after grinding | 88 | 10 | 1 | 1 | — | — | — | — | — | — | — | — |

We claim:

1. Rubber chemical preparation comprising rubber chemicals in finely divided form and a synthetic plasticizer carrier liquid, in which the rubber chemical particles have a mean diameter (weight average $d_{50}$) from 2 μm to 20 μm and exhibit a very narrow diameter distribution corresponding to $\delta d_{10}$–$d_{90} \leq 20$ μm.

2. The preparation of claim 1, wherein the rubber chemical is an accelerator.

3. The preparation of claim 1, wherein the rubber chemical is a cross-linking agent.

4. The preparation of claim 1, wherein the rubber chemical is an activator.

5. The preparation of claim 1, wherein the rubber chemical is a stabilizer.

6. The preparation of claim 1, containing 10–80 wt % rubber chemical and 90–20 wt % carrier liquid.

7. The preparation of claim 1 in the form of a paste containing no particles >50 μm.

8. The preparation of claim 1 in the form of a paste containing no particles >30 μm.

9. The preparation of claim 1 wherein the rubber chemicals are ground.

10. A rubber chemical preparation consisting of ground particles of rubber chemicals and a synthetic plasticizer carrier liquid, wherein the rubber chemicals have a mean diameter of from 2 μm to 20 μm and have a narrow particle distribution of $\delta d_{10}$–$d_{90} \leq 20$ μm.

11. The preparation of claim 10, prepared by mixing the rubber chemicals and carrier fluid and grinding the mixture.

12. The preparation of claim 11, wherein the carrier liquid is a synthetic plasticizer and the rubber chemicals are selected from one or more of accelerators, cross-linking agents, ASM, activators and stabilizers.

* * * * *